US007615584B2

(12) United States Patent
Matthias et al.

(10) Patent No.: US 7,615,584 B2
(45) Date of Patent: Nov. 10, 2009

(54) METHOD OF PREPARATION OF A WATER BASED EPOXY CURING AGENT

(75) Inventors: Lohe Matthias, Frankfurt (DE); Michael Cook, De Meern (NL); Achim Klippstein, Krefeld (DE)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/405,266

(22) Filed: Mar. 17, 2009

(65) Prior Publication Data

US 2009/0176931 A1     Jul. 9, 2009

Related U.S. Application Data

(63) Continuation of application No. 11/002,024, filed on Dec. 2, 2004, now Pat. No. 7,528,183.

(30) Foreign Application Priority Data

Dec. 19, 2003   (EP) .................. 03029483

(51) Int. Cl.
  *C08L 63/00*  (2006.01)
  *C08L 79/00*  (2006.01)
  *C08L 79/02*  (2006.01)
  *C08G 65/26*  (2006.01)

(52) U.S. Cl. .............. 523/404; 523/400; 523/402; 523/403; 523/414; 523/417

(58) Field of Classification Search ............... None
See application file for complete search history.

(56) References Cited

U.S. PATENT DOCUMENTS

| 4,089,826 A | 5/1978 | Moss et al. |
| 5,246,984 A | 9/1993 | Darwen et al. |
| 5,567,748 A | 10/1996 | Klein et al. |
| 6,013,757 A | 1/2000 | Corley et al. |
| 6,221,934 B1 | 4/2001 | Stark et al. |
| 6,245,835 B1 | 6/2001 | Joerg et al. |
| 6,277,928 B1 | 8/2001 | Back et al. |
| 6,653,369 B2 | 11/2003 | Gerlitz et al. |

FOREIGN PATENT DOCUMENTS

| EP | 0714924 A | 6/1996 |
| EP | 0637324 B1 | 6/2000 |
| WO | 93/21250 A | 10/1993 |
| WO | 98/29467 | 7/1998 |

*Primary Examiner*—Michael J Feely
(74) *Attorney, Agent, or Firm*—Michael Leach

(57) ABSTRACT

The present invention relates to a method of preparation of a water based epoxy resin curing agent in dispersion form which is formed by combining an amine-functional dispersion (A) with an amine-functional curing agent (B). The invention also relates to the curing agent obtained from said method, its use for curing two component water based epoxy systems, compositions obtained from such curing and various uses of the compositions obtained.

11 Claims, No Drawings

METHOD OF PREPARATION OF A WATER BASED EPOXY CURING AGENT

CROSS-REFERENCE TO RELATED APPLICATIONS

This is a continuation of U.S. application Ser. No. 11/002,024, filed on Dec. 2, 2004.

BACKGROUND OF THE INVENTION

The present invention relates to a method of preparation of a water based epoxy resin curing agent in dispersion form which is formed by combining an amine-functional dispersion (A) with an amine-functional curing agent (B). The invention also relates to the curing agent obtained from said method, its use for curing two component water based epoxy systems, compositions obtained from such curing and various uses of the compositions obtained.

Epoxy curing agents in emulsion or dispersion form are well known in the art. For example, EP 0 637 324 (Klippstein, Air Products) describes hardeners or curing agents in the form of aqueous emulsions of active amino group-containing adducts made from an aqueous amine solution and an epoxy resin of a molecular weight greater than 700. The examplified curing agents, however, have viscosities above 500 mPa·s, and a pot life of less than 360 min.

U.S. Pat. No. 6,013,757 (Corley, Shell) describes the preparation of aqueous dispersions of polyamides that are used to cure liquid or solid epoxy resins. Polyamide curing agents are prepared from dicarboxylic acids and aminoalkylpiperazines that are dispersed in water to yield an oil in water emulsion.

EP 0 951 494 (Ghosh, Shell) describes the preparation of waterborne curing agent dispersions formed by the reaction of phenolic acids, a functional surfactant and an amine to form solid aryl amidoamines or solid aromatic glycidyl esters that optionally can be further reacted with a capping agent. Water is added under shear and phase inversion to yield an oil in water emulsion.

None of these reference provides for a curing agent for liquid epoxy resins which exhibits a low curing agent viscosity of less than 500 mPa·s, provides a long pot life of at least 360 min. and at the same time provides the ability to apply high solids coatings with liquid epoxy resins in combination with the required compatibility to yield transparent high gloss coatings. It is the object of the invention to overcome these and other drawbacks of the prior art.

SUMMARY OF THE INVENTION

The present invention relates to a method of preparation of a water based epoxy resin curing agent and the curing agent obtainable thereby, as defined in the appending claims. In a first aspect thereof the present invention thus relates to a method of preparation of a water based epoxy resin curing agent in dispersion form which water based curing agent is formed by combining an active amine-hydrogen containing amine-functional dispersion (A) with an active amine-hydrogen containing amine-functional curing agent (B) in solution or emulsion form, wherein said active amine-hydrogen containing amine-functional dispersion (A) comprises a reaction product of (a) a polyamine compound (a) having at least three active amine-hydrogen, and (b) an aqueous epoxy resin dispersion (b) having an epoxy solids equivalent weight of equal to or greater than 150 g/eq, preferably in the range of 150 to 2000 g/eq, and wherein said active amine-hydrogen containing amine-functional curing agent (B) has a solids hydrogen equivalent weight of 50-500 g/eq, preferably 100-200 g/eq, is capable of emulsifying a liquid epoxy resin to produce a stable emulsion and is capable of yielding coating preparations of high gloss.

In a second aspect the invention relates to a curing agent for epoxy resins, obtainable according to the method of the invention.

In a third aspect the present invention relates to the use of the curing agent of the invention in a two component water based epoxy system for curing modified and unmodified liquid or pre-dispersed epoxy resins.

In a fourth aspect the present invention relates to a composition, obtained from curing modified and unmodified liquid or pre-dispersed epoxy resins with a curing agent according to the invention.

In a fifth aspect the present invention further relates to the use of the above composition as primer, sealer, paint, filler, coating, covering, trowelling or self leveling composition, adhesive or modifier for cements and mortars, and the like. This use is preferably for protecting a variety of substrates including mineral, cementitious, ferrous, wooden or plastic substrates.

DETAILED DESCRIPTION OF THE DRAWINGS

Not applicable

DETAILED DESCRIPTION OF THE INVENTION

The above drawbacks and other disadvantages of the prior art can be overcome by the method of preparation of a water based epoxy resin curing agent of the present invention and the curing agent obtainable from said method.

In a first aspect thereof the present invention thus relates to a method of preparation of a water based epoxy resin curing agent in dispersion form which is formed by combining an active amine-hydrogen containing amine-functional dispersion (A) with an active amine-hydrogen containing amine-functional curing agent (B) in solution or emulsion form as described above.

With the addition of the above active amine-hydrogen containing amine-functional curing agent (B) the invention provides a low viscosity water based curing agent to cure liquid or pre-dispersed epoxy resins. Due to their low viscosities these curing agents allow e.g. for the application of water based high solid coatings that lead to improved performance properties such as a long working life, consistent gloss and hardness development over the pot life.

The possibility to provide for higher solids contents using the curing agent according to this invention at simultaneously low viscosity, when compared to conventional curing agents, is a desired property in water based systems. Firstly, such higher solid systems offer the ability to reduce the number of coats to achieve the same film thickness and thereby reducing coating application time and costs. Secondly, such systems can offer an improved film formation process and ultimately improved physical properties due to significantly less water being present.

Water based curing agents are either available as a solution in water, or as a dispersion in water. An "aqueous dispersion" in the context of this invention means that this dispersion has a continuous water phase, in which solid particles or liquid droplets of a curing agent or a resin are dispersed. The term "solution" refers to any clear, if highly colored liquid which contains dissolved therein a curing agent or resin and is transparent and free of turbidity to the naked eye.

Prior art curing agent solutions exhibit a high neat viscosity (typically 5,000-50,000 mPa·s) and consequently provide also for a high viscosity when mixed with an epoxy resin. In such curing agent solutions the viscosity is mostly determined by the molecular weight of the polymer and Van der Waals interactions. If the curing agent is dispersed in water, the viscosity is no longer controlled by the molecular weight of the polymer, but dominated by the viscosity of the aqueous phase.

One of the common problems with many of these conventional commercial water based systems is the relatively short pot life with liquid epoxy resins of only 1-2 hours. The time, in which the mixture is in emulsion form without separation to the naked eye, and in which coatings can be applied at an appropriate viscosity, and the cured coatings obtained therefrom are of a high and constant gloss, is referred to as the 'pot life'. Upon mixing with liquid epoxy resins, curing agents according to this invention can retain a stable viscosity over 6-8 hours at appropriate application viscosity and provide a significantly improved handling over current technology.

The individual components of the curing agent according to the present invention and the method of producing the same will be explained below. In general, the water based epoxy resin curing agent in dispersion form of the present invention is formed by combining an active amine-hydrogen containing amine-functional dispersion (A) with an active amine-hydrogen containing amine-functional curing agent (B) in solution or emulsion form.

The amine-functional dispersion (A)

Said amine-functional dispersion (A) comprises and preferably substantially consists of a reaction product of (a) a polyamine compound having at least three active amine-hydrogen, and (b) an aqueous epoxy resin dispersion having an epoxy solids equivalent weight of equal to or greater than 150 g/eq. The term "active amine-hydrogen" as used herein means any hydrogen attached to an amino nitrogen, which is capable of reacting with an epoxy group, as is known in the art.

The polyamine compound (a)

In general any amine-functional polyamine compound comprising at least three active amine-hydrogens can be used as the polyamine compound (a). Suitable compounds are known to the skilled worker. Preferably, the polyamine compound (a) comprises at least one, more preferably two primary amino groups. These may be attached to terminal or secondary or even tertiary carbon atoms. The amino groups may also be attached to two carbon atoms, bridging the same to form polyamino polyalkylene compounds or to form cyclic compounds. Terminal amino groups may optionally be alkylated, thereby reducing the number of active amine-hydrogens they contribute.

The polyamine compound (a) is preferably selected from the group consisting of (i) aliphatic, (ii) cycloaliphatic, (iii) araliphatic, and (iv) aromatic polyamines, and mixtures thereof. Such polyamines are well known to those skilled in the art.

Aliphatic polyamines (i) are preferably selected from the group consisting of linear or branched hydrocarbon polyamines and polyether containing polyamines, i.e. polyamines having an poly(oxyalkylene) backbone. The linear or branched hydrocarbon polyamine preferably contain at least 3 active amine-hydrogens, typically 3 to 20 active amine-hydrogens. They comprise at least 2 amino groups and typically 2 to 10 amino groups. They also comprise from 2 to 30, preferably 4 to 16 carbon atoms. The carbon atoms may be present in one single straight or branched hydrocarbon chain. They may also be present in the form of several straight or branched hydrocarbon chains bridged by one or more amino groups. Mixtures of aliphatic hydrocarbon polyamines may be used. Specific examples of the linear or branched hydrocarbon polyamines include ethylenediamine, diethylenetriamine, triethylenetetramine, tetraethylenepentamine, pentaethylene hexamine, higher polyethyleneamines, 1,2-propylenediamine, 1,3-propylenediamine, 1,4-butanediamine, 1,3-diaminopentane, hexamethylenediamine, 2-methyl-pentamethylenediamine, neopentanediamine, (2,2,4)- and (2,4,4)-trimethylhexamethylenediamine (TMD), aminoethylpiperazine, 1,6-hexamethylenediamine, N,N-dimethylaminodipropanetriamine, 7-aza-1,13-diaminotridecane and the like.

The polyether containing polyamines are preferably selected from the group consisting of polyether containing polyamines that contain at least 3 active amine-hydrogens, typically 3 to 20 active amine-hydrogen, at least 2 amino groups, typically 2 to 10 amino groups, and from 6 to 150, preferably 2 to 50 and most preferably 2 to 30 carbon atoms, and comprise 2 to 6, preferably 2 to 3 carbon atoms between the ether groups. Those skilled in the art will recognize that the polyether containing polyamines of the present invention comprise a poly(oxyalkylene) backbone. This backbone may a homo- or copolymer of two or more of the oxyalkylene monomer units. The preferred polyoxyalkylene polyamines are derived from poly(propylene oxide) or poly(ethylene oxide) or their copolymers. The polyether containing polyamines will preferably have an average molecular weight of 150 to 2000, preferably 150 to 500. The above definition shall encompass any polyamines comprising monomers other than oxyalkylene, such as polyols, glycidyl and/or bisphenol A and bisphenol F in their backbone.

Preferably, the polyether containing polyamine is a polyoxypropylene polyamine, most preferably a polyoxypropylene diamine or triamine. These preferably have an average molecular weight of 150 to 2000, more preferably 150 to 500. Most preferred are those polyoxypropylene diamines and triamines wherein at least one amine group is attached to a secondary carbon atom.

Corresponding polyether containing polyamines suitable as aliphatic polyamine compounds (a) are commercially available. Examples hereof are the poly(oxypropylene) diamines and triamines marketed by Huntsman under the Jeffamine® trade name, especially Jeffamine® D230, D400, D2000 and T403.

Another type of polyether containing aliphatic polyamines are cyanoalkylated, especially cyanoethylated and then hydrogenated polyalkylenes. More specifically these are polyamines obtained by cyano-$C_{2-10}$-alkylation and hydrogenation of polyethers such as poly(oxyalkylenes). In case of cyanoethylation, which is preferred, this results in diaminopropylethers such as poly(oxyalkylene) diaminopropylethers. Preferably the polyethers are as defined above.

Corresponding compounds are commercially available e.g. under the tradename Ancamine® 1922A from Air Products & Chemicals, Inc.

The cycloaliphatic polyamines (ii) are preferably selected from the group consisting of polyamines that contain 1 to 4 non-aromatic rings, at least 3 and typically 3 to 20 active amine-hydrogen, at least 2 and typically 2 to 10 amino groups, and from 4 to 30, preferably 6 to 20 carbon atoms, wherein the amine groups may be attached directly to the ring, or to an alkyl chain extending from the ring, or may be incorporated within the ring, or combinations thereof, and mixtures of the foregoing. Specific examples of these cycloaliphatic polyamines include isophoronediamine (IPDA), bis-(p-aminocyclohexyl)methane (PACM), the cyclohexanediamines (DCH), the so called methylene bridged polycycloaliphatic polyamines (MPCA), as described in U.S. Pat. No. 5,280,091, [5,2,1,0]-tricyclodecane-2,6-bis-hexamethylenediamine, norborane diamine (NBDA) and the like.

The araliphatic polyamines (iii) are preferably selected from the group consisting of polyamines that contain 1 to 4 aromatic rings, at least and typically 3 to 20 active amine-hydrogen, at least 2 and typically 2 to 10 amino groups, and from 8 to 30, preferably 8 to 20 carbon atoms, wherein at least two of the amine groups are attached to alkyl chains extending from the aromatic ring and mixtures thereof. Specific examples include m-xylylenediamine, p-xylylenediamine, and the like.

The aromatic polyamines (iv) are preferably selected from the group consisting of polyamines that contain 1 to 4 aromatic rings, at least 3 and typically 3 to 20 active amine-hydrogen, at least 2 and typically 2 to 10 amino groups, and from 6 to 30, preferably 6 to 20 carbon atoms, and where at least two of the amine groups are attached directly to an aromatic ring. Specific examples include methylenedianiline (MDA), 1,3- and 1,4-toluenediamines, m-phenylene-diamine (mPD) and the like.

The preferred class of polyamine compounds (a) are the polyoxyalkylene polyamines defined as a sub-class of aliphatic polyamines (i) and as described above.

The above polyamines can be use alone or in any blend with each other as the polyamine compound (a). In case of a blend, a blend of the preferred polyoxyalkylene polyamines and especially the poly(oxypropylene) diamines such as D230 with any of the above polyamines is preferred.

The Aqueous Epoxy Resin Dispersion (b)

The second component used for preparing the active amine-hydrogen containing amine-functional dispersion (A) is an aqueous epoxy resin dispersion (b).

The dispersion (b) has an epoxy solids equivalent weight of equal to or greater than 150 g/eq, preferably 150 to 2000 g/eq. The term "epoxy solids equivalent weight" means the weight in grams of resin (excluding solvents and water) that contains one mole of epoxide functional groups. It can be determined by titration with perchloric acid in the presence of a tetraalkylammonium bromide compound, as is well known to those skilled in the art. The functionality of a resin refers to the average number of functional groups per molecule, here epoxy groups.

The functionality and the epoxy solids equivalent weight depend on the type of resin used and these dependencies differ from one class to another, as is well known to the skilled worker. General classes of resins suitable as aqueous dispersions (b) are bisphenol based resins and Novolac epoxy resins. Preferably the neat resin is solid at room temperature and is pre-dispersed in water to form the aqueous epoxy resin dispersion (b) using known dispersants and processes.

In one embodiment, the epoxy resin dispersion (b) is a bisphenol based resin and has an average epoxy functionality of up to 2, and preferably equal to 2. These resins further typically have an epoxy solids equivalent weight in the range of 400 g/eq to 2000 g/eq, preferably 400 to 700 g/eq. More preferably, the bisphenol based epoxy resin dispersion (b) is selected from the group consisting of bisphenol A glycidyl ethers, bisphenol F glycidyl ethers, modified bisphenol A glycidyl ethers, modified bisphenol F glycidyl ethers and mixtures thereof, most preferably those having an epoxy solids equivalent weight in the range of 400 to 700 g/eq.

Examples of suitable bisphenol based resins are described in U.S. Pat. No. 4,415,682, U.S. Pat. No. 4,315,044, U.S. Pat. No. 5,236,974, U.S. Pat. No. 5,604,269 or U.S. Pat. No. 4,399,242 which are incorporated by reference herein. Commercially available examples include those sold under the trademarks Beckopox® EP384w/53WAMP, Beckopox® EP385, Beckopox® VEP2380w/58WA, Beckopox® VEP2381w/55WA, Beckopox® VEP2382w/55WA, Beckopox® 2390w/75 MP, Epi-Rez® 3520-WY55, Epi-Rez® 3521WY53, Epi-Rez® 5520W60, Epi-Rez® DPW6520, Epi-Rez® 3522W60, 3535WY60, Epi-Rez® 3540WY55, Epi-Rez® 3546WH53, Epi-Rez® 5522WY55, Araldite® PZ3961, Araldite® PZ3962, Waterpoxy® 1422 or Waterpoxy® 1455, of which Beckopox® EP384w/53WAMP is most preferred.

Utilization of the above resin dispersions is preferred to achieve the targeted high conversion rate of the polyamine and to yield at the same time low viscosity products in accordance with the intent of this invention. The use of pre-dispersed bisphenol based epoxy emulsions with an epoxy solid equivalent weight of less than 300 g/eq is not ideal as these tend to increase the viscosity more rapidly and may not allow the manufacture of the desired low viscosity amine dispersions. An epoxy solid equivalent weight of these emulsions in the range of 400 g/eq to 2000 g/eq is therefore preferred.

In another embodiment, the epoxy resin dispersion (b) is a Novolac epoxy resin dispersion, the Novolac epoxy resin having an average epoxy functionality of greater than 2. These typically have epoxy solids equivalent weight in the range of 150 g/eq to 300 g/eq. Corresponding Novolacs are well known to the skilled worker. Commercially available resins of that kind include Epi-Rez® 5003W55, Epi-Rez® 6006W70 or Araldite® PZ323.

Optionally mixtures of the above resin dispersions can be employed.

The polyamine compound (a) and the aqueous epoxy resin dispersion (b) are combined to yield reaction product (A), such that this reaction product comprises active amine-hydrogen and is amine-functional. Accordingly an equivalent excess of the polyamine (a) over the epoxy resin dispersion (b) is used.

Preferably, the equivalent ratio of polyamine (a) to epoxy resin dispersion (b) used in forming the active amine-hydrogen containing amine-functional dispersion (A) varies from 2:1 to 20:1, preferably from 4:1 to 8:1 and is most preferably 5:1.

Combining of (a) and (b) will typically be by mixing, which can in general be in any order and by any means known to the skilled worker. Preferably, the aqueous dispersion of (b) is added to (a). Mixing typically starts the amine epoxy reaction to form the reaction product (A). The epoxy resin dispersion (b) and the polyamine (a) are typically mixed at a reaction temperature ranging from 20 to 100° C., preferably 50 to 70° C., most preferably about 60° C.

Formation of the active amine-hydrogen containing amine-functional dispersion (A) in general takes place in the presence of water as (b) is an aqueous dispersion. It may also take place in the presence of a surfactant. Any known surfactant may be used. Preferred examples of such surfactant are ethoxylated fatty acids such as Disponil® 23, polyoxyethylenated alkylphenols such as Tergitol® 15S-12 or Marlophen® NP30 or ethoxylated acetylenic diols such as Surfynol® 465. This list is illustrative rather than restrictive.

Mixing occurs typically under stirring, more typically vigorous stirring. After mixing of (a) and (b) the mixture is preferably held at the reaction temperature for formation of the active amine-hydrogen containing amine-functional dispersion (A). Holding is most preferably continued until the amine epoxy reaction is complete.

The reaction product (A) thus obtained is then combined with an active amine-hydrogen containing amine functional curing agent (B) to form the curing agent of the invention.

The Active Amine-Hydrogen Containing Amine-Functional Curing Agent (B)

The active amine-hydrogen containing amine-functional curing agent (B) can be any known active amine-hydrogen containing amine-functional curing agent (B) that can independently be used for the formulation of water based epoxy systems, provided it has a solids hydrogen equivalent weight in the range of 50-500 g/eq, preferably in the range of 100-200 g/eq;

is capable of emulsifying a liquid epoxy resin to produce a stable emulsion; and is capable of yielding coating preparations of high gloss.

The term "solids hydrogen equivalent weight" as used herein means the weight in grams of resin (excluding solvents and water) that contains one mole of active amine-hydrogen as the functional group. The term is well known to those skilled in the art. The equivalent weight will be an average value over the entire resin composition.

An active amine-hydrogen containing amine-functional curing agent is considered suitable for use as component (B) of the current invention, if it:

produces an emulsion with a liquid epoxy resin which emulsion is stable in that it shows no phase separation for at least 30 min., preferably at least 60 min. to the naked eye; and provides itself a gloss of at least 70 at an angle of 200 as measured in accordance with ISO 2813-1978, preferably a gloss of at least 80;

when tested by forming an emulsion by hand mixing of a liquid bisphenol-A epoxy resin with an equivalent weight of 185 to 195 g with a stoichiometric equivalent of a 40 wt.-% aqueous solution or dispersion of (B), percentage being based on total weight of the solution or dispersion of (B), then optionally and, if necessary at all, diluting the resulting mixture with water to obtain a viscosity of 200 to 600 mPa·s, preferably 400 to 600 mPa·s, drawing a 150 µm wet film on a S-36 steel panel (obtainable from Q-PANEL LAB PRODUCTS, Cleveland, Ohio, US) or equivalent and curing at 20 to 25° C. and a relative humidity of 50 to 70%.

For example the following test can be carried out: To 10 g of a solution or dispersion of (B) in water at a solids content of about 40 wt.-%, a stoichiometric equivalent of liquid bisphenol-A epoxy resin with an equivalent weight of 185 to 195 g is added. The addition will be carried out under vigorous hand-mixing to form an emulsion. The emulsion thus obtained is diluted with water, if necessary, to obtain a suitable application viscosity of 200 to 600 mPa·s, more preferably 400 to 600 mPa·s, most preferably about 500 mPa·s, which is typically also carried out under vigorous hand-mixing. The diluted mixture may be allowed to stand for an appropriate time, typically between 10 and 20 minutes, e.g. 15 minutes. Thereafter a 150 µm wet film is drawn on a S-36 steel panel and is allowed to cure. Curing may e.g. be for 12 to 36 h, typically 24 hours at a temperature of 20° C. to 25° C. at 50 to 70%, preferably 50 to 60% relative humidity. The gloss is then measured at an angle of 200 using a commercial gloss meter such as Micro TRI Gloss meter available from BYK Gardner in accordance with ISO 2813-1978.

The curing agent is suitable for use as (B) if it meets the above two criteria as to dispersion stability and gloss.

Any known water based epoxy curing agent meeting these criteria can be used as the curing agent (B) of the present invention. To meet the same, the active amine-hydrogen containing amine functional curing agent (B) will typically have an amphiphilic structure. The term "amphiphilic structure" as used herein shall designate any molecule having both hydrophilic and lipophilic properties. To do so, the molecule will typically comprise a polar or even charged moiety and another non-polar moiety such as an longer aliphatic hydrocarbon residue.

According to a preferred embodiment, the active amine-hydrogen containing amine functional curing agent (B) comprises the reaction product of an polyamine and a fatty acid, which reaction product has terminal amino groups. The polyamine is defined as set out above for the polyamine (a). In this case the polyamine is, more preferably selected from the aliphatic linear or branched hydrocarbon polyamines as defined in (i), most preferably aliphatic hydrocarbon diamines.

The fatty acid may be any fatty acid which provides appropriate lipophilicity to the reaction product. Mono- and polyhydric acids, and their adducts such as esters and ethers and mixtures thereof may be used. Typically the fatty acid will comprise 10 to 30 carbon atoms.

Optionally, the fatty acid polyamine reaction product may be further modified. This may be by adduction with an epoxy resin or by treatment with formaldehyde. The curing agent (B) of this embodiment may also be used in form of its salt to increase the hydrophilic character thereof and improve its emulsification characteristics. The salt can be obtained by adding an appropriate amount of a suitable organic or inorganic acid such as acetic acid to the above reaction product for formation of an acid addition salt. This technology is well known to the skilled worker and e.g. disclosed in GB 1,108,558 or EP 0,099,198.

According to another preferred embodiment, the active amine-hydrogen containing amine functional curing agent (B) comprises the reaction product of a polyamine with a mono- or polyepoxide compound, which product has terminal amino groups. Said mono- or polyepoxide compounds are selected from the group consisting of epoxidized resins of bisphenol-A, alkoxylated bisphenol-A, bisphenol-F, alkoxylated bisphenol-F, Novolac, mono- or polyfunctional alcohols and esters or mixtures thereof, as they are known to the skilled worker. Any polyamine as defined above for (a) can be used. These epoxy resin/amine reaction products may also be further modified with for example formaldehyde and acid salting as described above for the fatty acid polyamine reaction product.

Examples of suitable amine-functional curing agents (B) include commercially available as well as non-commercial intermediates that are described in EP 0 637 324, U.S. Pat. Nos. 5,246,984, 4,197,389, and others which are incorporated herein by way of reference. Preferred commercial examples are the ones sold under the names EPILINK® 701, EPILINK® 660, EPILINK® 661, EPILINK® 360 or Anquamine® 401 and Anquamine® 670 by Air Products & Chemicals, Inc., EPILINK® 701 being especially preferred. The given examples of amine-functional curing agents (B) are illustrative rather than restrictive. Further examples of curing agent (B) can be found in F. H. Walker and M. I. Cook, "Two-Component Waterborne Epoxy Coatings", in J. E. Glass (ed.), Technology for Waterborne Coatings, American Chemical Society, ©997, pp. 71-93 and references therein, all of which are included by reference.

Mixing of the active amine-hydrogen containing amine-functional dispersion (A) and the active amine-hydrogen containing amine-functional curing agent (B) can be in any order and by any appropriate means. The active amine-hydrogen containing amine-functional curing agent (B) may also be mixed with the polyamine (a) prior to the addition of the epoxy resin dispersion (b) i.e. prior to forming the reaction product (A).

Mixing of (A) and (B) is preferably carried out at a temperature in the range of 20 to 100° C., preferably 50 to 70° C., most preferably 60° C.

Preferably, the solids weight ratio of (A):(B) may vary from 99:1 to 50:50, preferably 95:5 to 80:20, and most preferably is 90:10. These mixing ratios of amine-functional dispersion (A) and amine-functional curing agent (B) have been investigated and have been found to yield product compositions in accordance with this invention with excellent compatibility and coating preparations with high gloss and transparency.

Using amine-functional curing agents (B) compared to non-amine functional materials is advantageous in that the amine-functional products co-react with the epoxy resin and will be fully integrated into the final polymer network. In contrast, non-amine functional materials that are not capable of reacting with an epoxy resin are prone to migration from the coating into an interfacing material. Such coatings exhibit inferior performance such as increased water sensitivity, lower corrosion resistance or inferior chemical resistance.

The Water Based Epoxy Resin Curing Agent in Dispersion Form and its Uses

In a second aspect the invention relates to a water based curing agent for epoxy resins, obtainable according to the above disclosed method.

In a preferred embodiment water based epoxy resin curing agents in dispersion form are provided, wherein the polyamine (a) is a polyether containing polyamine selected from polyether containing polyamines having an average molecular weight of 150 to 2000, that contain at least of 3 active amine-hydrogens, at least 2 amino groups, and from 6 to 150 carbon atoms, and comprise 2 to 6 carbon atoms between the ether groups. Most preferably the polyamine is selected from the group consisting of poly(oxypropylene) diamines, poly(oxypropylene)triamines and mixtures thereof.

Also preferably, in said water based curing agent for epoxy resins the epoxy resin dispersion (b) used for making the same is a pre-dispersed solid epoxy resin dispersion of an optionally modified bisphenol A diglycidyl ether having an average epoxy functionality of up to 2 and an epoxy solids equivalent weight in the range of 400 to 2000 g/eq, preferably 400 to 700 g/eq.

Also preferably, the active amine-hydrogen containing amine-functional curing agent (B) used for making said water based curing agent for epoxy resins of the invention is an optionally modified adduct of a polyamine compound and an epoxy compound, said adduct having terminal amino groups or a salt of such adduct. A preferred commercialized example of such curing agent (B) is EPILINK® 701 as sold by Air Products & Chemicals, Inc. Mixtures of curing agents (B) may likewise be used.

The curing agent of the invention has advantageously low viscosities such as below 500 mPa·s, more preferably 50 to 300 mPa·s.

In a third aspect the present invention relates to the use of the curing agent of the invention in a two component water based epoxy system for curing modified and unmodified liquid or pre-dispersed epoxy resins. Any water based epoxy resin systems may be used as known to the skilled worker.

In said use the ratio of the active amine-hydrogen containing amine-functional curing agent to the epoxy resin to be cured is preferably in the range of 100:75 to 100:200, based on the amine equivalent weight of the curing agent and the epoxy equivalent weight of the resin.

The use of the curing agent of the invention provides for a surprising increase in potlife of the epoxy system to be cured as disclosed above.

Curing generally occurs upon mixing of the epoxy resin with the curing agent. Preferably, the curing process is conducted in a temperature range from 0 to 200° C., preferably from 5 to 80° C., most preferably from 5 to 35° C.

A coating obtained after curing is defined to have a "high gloss" in the context of this invention, if a gloss of at least 130 at 20° angle on glass panels is obtained, when measured in accordance with ISO 2813-1978 as set out above.

In a fourth aspect the present invention relates to a composition, obtained from curing modified and unmodified liquid or pre-dispersed epoxy resins with a curing agent according to the invention.

This composition of the invention may further comprise conventional additives selected from the group consisting of pigments, pigment pastes, fillers, coalescing aids, solvents, wetting agents, anti-foam agents or rheology modifiers, and the like.

In a fifth aspect the present invention further relates to the use of the above composition as primer, sealer, paint, filler, coating, covering, trowelling or self leveling composition, adhesive or modifier for cements and mortars, and the like. The use as a coating is preferred, as this coating can provide for an advantageous protection of the substrate. By such use a variety of substrates including mineral, cementitious, ferrous, wooden or plastic substrates can be protected.

For said use according to the fifth aspect of the invention the compositions are preferably applied to the substrate by any appropriate means, such as by brush, spray or roller. Corresponding technologies are well known and need not be described here.

The invention will be further illustrated by the following examples which are given for illustration purposes only and are not intended to limit the scope of the invention.

EXAMPLES

Example 1

Preparation of an Amine-Functional Dispersion (A) From Polyamine and Solid Epoxy Resin Dispersion A 2 liter, 4 necked round bottom flask, equipped with a mechanical stirrer, thermocouple and dropping funnel was charged with 194.5 g (3.36 eq) of a poly(oxypropylene)diamine (Jeffamine® D230, Huntsman), 139.0 g of water and 5.0 g of an ethoxylated fatty acid (Disponil® 23, Cognis). The contents of the flask were heated to 60° C. at which point 662.6 g (0.68 mol) of Beckopox® EP384 were added over a 15 minutes period while maintaining a reaction temperature of 60° C.

After the addition was complete the batch was held at this temperature for further 60 minutes and the product was transferred into an appropriate container. Recovery of the product was equivalent to 98.5% of the theoretical yield. The resulting product was a white dispersion that had a theoretical solids content of 55.0%, a viscosity of 120 mPa·s at 25° C. and an amine value of 96 mg (KOH)/g. The resulting product had a storage stability in excess of 6 months as determined by visual inspection (no macroscopic phase separation of the dispersion).

Example 2

Preparation of a Blend of Amine-Functional Dispersion (Example 1) and Amine-Functional Curing Agent (B)

500.0 g of the amine-functional dispersion of Example 1 and 50.0 g of Epilink® 701 (Air Products & Chemical Inc) as the amine-functional curing agent (B) were charged to a 1 liter round bottom flask equipped with a mechanical stirrer and thermocouple. The mixture was heated to 60° C. and stirred for 30 minutes until the batch was homogeneous.

Recovery of the product was equivalent to 98.5% of the theoretical yield. The resulting product was a white dispersion with a theoretical solids content of 55.0%, a viscosity of 170 mPa·s at 20° C. and an amine value of 99 mg (KOH)/g. The theoretical hydrogen equivalent weight for the curing agent was approximately 350. The resulting product had a storage stability in excess 6 months as determined by visual inspection (no macroscopic phase separation of the dispersion).

Example 3A-I

Preparation of Additional Amine-Functional Dispersions (A)

Additional amine dispersions (A) were prepared following the procedures outlined in Example 1. A summary of variation of polyamines and ratio of polyamine compound (a) to solid epoxy dispersion (b) is described in Table 1.

In addition to Example 1, Examples 3A, 3B and 3C describe amine-functional dispersions (A) prepared from poly(oxypropylene) diamine Jeffamine® D230 with variation of the equivalent ratio of polyamine compound (a) to solid resin dispersion (b). Stable amine dispersions (A) were obtained at ratios of 4, 10 and 20 equivalents of D230 per equivalent of solid epoxy resin dispersion. Similarly, amine-functional dispersions (A) based on other poly(oxypropylene) diamines (Jeffamine® D400) or meta-xylylenediamine, MXDA (Example 3D, 3E) could be prepared that exhibited a storage stability in excess of 3 months.

Amine-functional dispersions (A) from isophoronediamine (IPDA), 1,6-diamino 2,2,4-trimethylhexane (TMD) and p-aminocyclohexylmethane (PACM) were prepared (3F, 3G, 3H), showing earlier phase separation of the dispersion obtained. They nevertheless have desirably low viscosity and good performance.

A blend of polyamines was used in Example 3I where a blend of D230 and PACM was reacted with the resin dispersion (b) and a stable amine-functional dispersion was obtained.

Common to all tested amine-functional dispersions is the extremely low product viscosity of less than 500 mPa·s. This viscosity is at least one order of magnitude lower compared to conventional curing agent technology suitable to cure liquid epoxy resin.

TABLE 1

Amine-functional dispersions (A) with variation of polyamines and stoichiometry

| | Example | | | | | | | | |
|---|---|---|---|---|---|---|---|---|---|
| | 3A | 3B | 3C | 3D | 3E | 3F | 3G | 3H | 3I |
| Raw Material | | | | | | | | | |
| EP384 | 466.1 | 317.4 | 211.1 | 341.2 | 504.4 | 475.8 | 485.5 | 446.0 | 438.0 |
| Water | 74.0 | 143.9 | 194.2 | 131.9 | 55.9 | 68.9 | 64.3 | 84.0 | 87.1 |
| Disponil 23 | 0.6 | 0.6 | 0.6 | 0.6 | 0.6 | 0.6 | 0.6 | 0.7 | 0.8 |
| D230 | 109.0 | 187.0 | 244.4 | — | — | — | — | — | 61.3 |
| D400 | — | — | — | 174.2 | — | — | — | — | — |
| MXDA | — | — | — | — | 87.7 | — | — | — | — |
| IPDA | — | — | — | — | — | 102.7 | — | — | — |
| TMD | — | — | — | — | — | — | 97.5 | — | — |
| PACM | — | — | — | — | — | — | — | 119.3 | 61.3 |
| Amine/Resin (wt-eq/wt-eq) | 4 | 10 | 20 | 5 | 5 | 5 | 5 | 5 | 5 |
| Properties | | | | | | | | | |
| Viscosity [mPa·s] | 220 | 30 | 50 | 95 | 356 | 395 | 420 | 210 | 120 |
| Amine value [mgKOH/g] | 80 | 135 | 175 | 85 | 104 | 106 | 104 | 99 | 95 |
| Theoretical Solids [%] | 55.0 | 55.0 | 55.0 | 55.0 | 55.0 | 55.0 | 55.0 | 55.0 | 55.0 |
| HEW | 460 | 220 | 160 | 470 | 315 | 330 | 330 | 365 | 365 |
| Dispersion stability In months | >3 | >3 | >3 | >3 | >3 | s, 1 | s, 1 d* | s, 1 | >3 | s: macroscopic phase separation
*1 d = one day only

Example 4

Preparation of Coating Compositions and Evaluation of Active Amine-Hydrogen Containing Amine-Functional Dispersion (A) in Comparison to Water Based Epoxy Resin Curing Agent in Dispersion Form Comprising (A) and (B) in Accordance with this Invention Clear coatings have been prepared from the above described amine-functional dispersions (A) alone and from compositions where the amine-functional dispersion was further modified with an amine-functional curing agent (B). The preparation of the water based epoxy resin curing agent in dispersion form in accordance with this invention was prepared as outlined in example 2 prior to the coating preparation. The epoxy resin employed for curing tests was a commercially available standard liquid epoxy resin. All curing agents to be tested were mixed with the epoxy resin at 1:1 stoichiometry and diluted with demineralized water to an active solids content of 60% unless otherwise noted. Upon mixing and dilution the resultant emulsions were applied onto glass panels at 150 μm wet film thickness (WFT) after time intervals of 15, 30, 60, 120, 240 and 360 minutes, if possible.

Evolution of emulsion viscosity was measured in the same time intervals at 20° C. using a Brookfield viscometer equipped with a T-spindle. The coatings were cured for 24 hrs at 20° C., 60% relative humidity and assessed for surface appearance, consistency of gloss (20°) and Perzos hardness. Requirements for a high performance coating include a high degree of transparency, a high and consistent gloss value (>130 at 20° angle on glass panels) with a variation no greater than 20%. An average pot life was defined when these criteria were met and maintained, and the viscosity had no more than tripled. For comparison conventional curing agents for liquid epoxy resin have been evaluated (C23, C24).

The data in the attached Table 2 show that the performance of coatings based on the curing agents of this invention are superior to current water based technology in several aspects. Performance enhancements to highlight are the noticeable longer pot life with liquid epoxy resins and the possibility to yield higher solids coatings. Other performance parameters such as dry speed are of comparable quality compared with existing technology.

Table 2 depicts that commercially available water based curing agents for standard liquid epoxy resin produce highly transparent coatings with consistently high gloss values (Epilink® 360, Epilink® 660). However, their practical use is limited by the time that a sufficiently low and stable viscosity is achieved. This time interval (pot life) for use with liquid epoxy resins is typically 60-120 minutes (Epilink® 360, Epilink® 660). In contrast, the curing agent according to the invention (Example 2) exhibits a stable viscosity with consistently high gloss and hardness values over more than 360 minutes. Additionally, the current water based curing agent technology for liquid epoxy resin allows the application of coatings at a solid content in the range of 30-45% solids at ~200 mPa·s application viscosity. The invention provides curing agents of such low viscosity that the application of 60% solids is easily achieved at a similar application viscosity. Such higher solids systems for liquid epoxy resins are novel and allow the reduction of number of coats to yield the same dry film thickness. They thereby reduce the time and cost associated with the painting process.

Further examination of Table 2 indicates that Example 1, which is the amine-functional dispersion (A) not modified with an amine-functional curing agent (B) does not have the desired degree of resin compatibility. This incompatibility results in a poor coating appearance with opaque surface appearance being visible which is also confirmed by the poor gloss values. Such coating appearance would not be suitable for practical use and pot life would be described as zero minutes.

Modification with an amine-functional curing agent (B), such as Epilink® 701, is required (Example 2) to obtain a highly compatible curing agent composition yielding transparent coatings with consistently high gloss throughout the entire pot life. It is neither obvious nor expected that the addition of an amine functional curing agent such Epilink® 701 provides at least equal or better viscosity pot life stability (>360 min) compared to the neat dispersion (1) of Example 1. When Epilink 701 or similar is used with liquid epoxy resin on its own a significantly shorter pot life of 60-120 minutes is observed.

Although the present invention has been described with reference to preferred embodiments thereof as well as working examples, these are not to be construed so as to limit the scope of the same, which shall be exclusively governed by the appending claims.

TABLE 2

Performance of Clear Coatings

| Example | Curing Agent Ex. | Appearance 30 | 60 | 120 | 240 | 360 | Viscosity [Pa·s] 30 | 60 | 120 | 240 | 360 | Gloss (20°) 30 | 60 | 120 | 240 | 360 | Hardness | Pot Life |
|---|---|---|---|---|---|---|---|---|---|---|---|---|---|---|---|---|---|---|
| C1 | 1 | o | o | o | o | o | 0.4 | 0.5 | 0.6 | 0.8 | 0.9 | 6 | 9 | 11 | 20 | 44 | 153 | 0 |
| C2 | 2 | t | t | t | t | t | 0.4 | 0.5 | 0.6 | 0.8 | 0.9 | 156 | 172 | 175 | 164 | 159 | 175 | >360 |
| C3 | 1 + B1 | t | t | t | t | t | 0.3 | 0.3 | 0.3 | 0.5 | 0.6 | 155 | 148 | 173 | 140 | 160 | 190 | >360 |
| C4 | 1 + B2 | t | t | t | t | t | 0.3 | 0.3 | 0.3 | 0.3 | 0.4 | 160 | 150 | 128 | 128 | 145 | 190 | >360 |
| C5 | 1 + PA3 | o | o | o | o | o | 0.3 | 0.3 | 0.4 | 0.4 | 0.4 | 27 | 55 | 40 | 48 | 11 | 200 | 0 |
| C6 | 1 + PA4 | o | o | o | | | 0.4 | 1.0 | 1.8 | g | | 83 | 80 | 82 | | | 170 | 0 |
| C7 | 3A | o | o | o | o | o | 0.3 | 0.3 | 0.4 | 0.6 | 0.7 | 15 | 28 | 22 | 34 | 38 | 210 | 0 |
| C8 | 3A + B3 | t | t | t | t | t | 0.2 | 0.2 | 0.2 | 0.3 | 0.4 | 155 | 171 | 162 | 140 | 128 | 220 | >360 |
| C9 | 3B | o | o | o | o | o | 0.2 | 0.2 | 0.3 | 0.3 | 0.4 | 32 | 45 | 38 | 23 | 48 | | 0 |
| C10 | 3B + B3 | o | t | t | t | t | 0.2 | 0.2 | 0.2 | 0.2 | 0.3 | 130 | 132 | 162 | 165 | 161 | 155 | >360 |
| C11 | 3C | o | o | o | o | o | 0.2 | 0.2 | 0.2 | 0.3 | 0.4 | 23 | 35 | 43 | 44 | 39 | <50 | 0 |
| C12 | 3C + B3 | o | t | t | t | t | 0.2 | 0.2 | 0.3 | 0.4 | 0.5 | 149 | 150 | 163 | 123 | 129 | 65 | >360 |
| C13 | 3D | o | o | o | o | o | 0.2 | 0.2 | 0.2 | 0.3 | 0.4 | 45 | 53 | 62 | 58 | 65 | <50 | 0 |
| C14 | 3D + B3 | o | t | t | t | | 0.2 | 0.2 | 0.4 | 0.6 | 0.8 | 142 | 146 | 154 | 153 | 156 | <50 | >360 |
| C15 | 3E | o | o | o | | | 0.3 | 0.6 | 1.0 | g | | 20 | 44 | 69 | | | 250 | 0 |
| C16 | 3E + B3 | t | t | t | | | 0.3 | 0.5 | 0.8 | g | | 136 | 126 | 131 | | | 300 | 120 |

TABLE 2-continued

Performance of Clear Coatings

| Example | Curing Agent Ex. Time [min] | Appearance 30 | 60 | 120 | 240 | 360 | Viscosity [Pa·s] 30 | 60 | 120 | 240 | 360 | Gloss (20°) 30 | 60 | 120 | 240 | 360 | Hardness | Pot Life |
|---|---|---|---|---|---|---|---|---|---|---|---|---|---|---|---|---|---|---|
| C17 | 3F | o | o | o | o | | 0.2 | 0.4 | 0.8 | 0.9 | g | 18 | 25 | 23 | 7 | | 165 | 0 |
| C18 | 3F + B3 | t | t | o | o | | 0.4 | 0.5 | 0.6 | 0.9 | g | 120 | 115 | 60 | 20 | | 180 | 60 |
| C19 | 3H | o | o | o | o | o | 0.2 | 0.2 | 0.5 | 0.5 | 0.7 | 3 | 5 | 3 | 7 | 5 | 80 | 0 |
| C20 | 3H + B3 | t | t | t | t | t | 0.5 | 0.5 | 0.5 | 0.6 | 2.0 | 65 | 126 | 132 | 11 | 2 | 240 | 120 |
| C21 | 3I | o | o | o | o | o | 0.1 | 0.1 | 0.1 | 0.2 | 0.2 | 43 | 52 | 68 | 31 | 13 | 156 | 0 |
| C22 | 3I + B3 | t | t | t | t | t | 0.3 | 0.4 | 0.5 | 0.7 | 1.1 | 147 | 160 | 158 | 156 | 148 | 250 | >360 |
| C23 | E360† | t | t | | | | 1.0 | 0.8 | g | | | 134 | 148 | | | | 90 | 60 |
| C24 | E660†† | t | t | t | | | 0.2 | 0.3 | 0.8 | g | | 161 | 166 | 148 | | | 150 | 90 | o: opaque;
t: transparent;
g: gelled
B1: Anquamine ® 401, Air Products & Chemicals Inc.;
B2: Epilink ® 661, Air Products & Chemicals Inc.;
PA3: ethylene diamine adduct with BADGE, isolated;
PA4: diethylenetriamine adduct with phenylglycidylether;
B3: Anquamine ® 670, Air Products & Chemicals Inc.
†Epilink ® 360, Air Products & Chemicals Inc.; conventional curing agent for liquid epoxy resin; tested at 30% solids.
††Epilink ® 660, Air Products & Chemicals Inc.; conventional curing agent for liquid epoxy resin; tested at 40% solids.

What is claimed:

1. A curing agent in dispersion form for water based epoxy resins, obtained by a method of preparation of a water based epoxy resin curing agent in dispersion form, which water based curing agent is formed by combining an active amine-hydrogen containing amine-functional dispersion (A) with an active amine-hydrogen containing amine-functional water based curing agent (B) in solution or emulsion form;
wherein said active amine-hydrogen containing amine-functional dispersion (A) comprises a reaction product of:
a) a polyamine compound having at least three active amine-hydrogen, and
b) an aqueous epoxy resin dispersion having an epoxy solids equivalent weight of equal to or greater than 150 g/eq;
wherein said active amine-hydrogen containing amine-functional water based curing agent (B): has an amphiphilic structure and a solids hydrogen equivalent weight of 50-500 g/eq; is capable of emulsifying a liquid epoxy resin to produce a stable emulsion; and is capable of yielding coating preparations of high gloss; and
wherein the curing agent in dispersion form, at 5500 solids, has a viscosity less than 500 mPa's at 20° C.

2. The curing agent in dispersion form for water based epoxy resins according to claim 1, wherein the polyamine (a) is a polyether containing polyamine selected from polyether containing polyamines having a number average molecular weight of 150 to 2000, that contain at least 3 active amine-hydrogens, at least 2 amino groups, and from 6 to 150 carbon atoms, and comprise 2 to 6 carbon atoms between the ether groups.

3. The curing agent in dispersion form for water based epoxy resins according to claim 2, wherein the epoxy resin dispersion (b) is a pre-dispersed solid epoxy resin dispersion of an optionally modified bisphenol A diglycidyl ether having an average epoxy functionality of up to 2 and an epoxy solids equivalent weight in the range 400 to 700 g/eq.

4. Composition, obtained from curing modified or unmodified, liquid or pre-dispersed solid epoxy resins with a curing agent in dispersion form for water based epoxy resins according to claim 2.

5. The curing agent in dispersion form for water based epoxy resins according to claim 1, wherein the epoxy resin dispersion (b) is a pre-dispersed solid epoxy resin dispersion of an optionally modified bisphenol A diglycidyl ether having an average epoxy functionality of up to 2 and an epoxy solids equivalent weight in the range of 400 to 700 g/eq.

6. Composition, obtained from curing modified or unmodified, liquid or pre-dispersed solid epoxy resins with a curing agent in dispersion form for water based epoxy resins according to claim 5.

7. The curing agent in dispersion form for water based epoxy resins according to claim 1, wherein the active amine-hydrogen containing amine-functional curing agent (B) is an optionally modified adduct of a polyamine compound and an epoxy compound, said adduct having terminal amino groups.

8. Composition, obtained from curing modified or unmodified, liquid or pre-dispersed solid epoxy resins with a curing agent in dispersion form for water based epoxy resins according to claim 7.

9. A method of curing modified or unmodified liquid or pre-dispersed epoxy resins which comprises combining a curing agent in dispersion form according to claim 1 with a modified or unmodified liquid or pre-dispersed epoxy resin in a two component water based epoxy system.

10. Composition, obtained from curing modified or unmodified, liquid or pre-dispersed solid epoxy resins with a curing agent in dispersion form for water based epoxy resins according to claim 1.

11. The composition of claim 10 in form of a primer, sealer, paint, filler, coating, covering, trowelling or self leveling composition, adhesive or modifier for cements and mortars.

* * * * *

UNITED STATES PATENT AND TRADEMARK OFFICE
CERTIFICATE OF CORRECTION

| | | |
|---|---|---|
| PATENT NO. | : 7,615,584 B2 | Page 1 of 1 |
| APPLICATION NO. | : 12/405266 | |
| DATED | : November 10, 2009 | |
| INVENTOR(S) | : Lohe Matthias, Michael Cook and Achim Klippstein | |

It is certified that error appears in the above-identified patent and that said Letters Patent is hereby corrected as shown below:

Column 15, Line 47

In claim 1 delete "5500" and insert --55%--

Signed and Sealed this

Twenty-second Day of December, 2009

David J. Kappos
*Director of the United States Patent and Trademark Office*